US010635992B2

(12) United States Patent
Gross et al.

(10) Patent No.: US 10,635,992 B2
(45) Date of Patent: Apr. 28, 2020

(54) REDUCING BANDWIDTH REQUIREMENTS FOR TELEMETRY DATA USING A CROSS-IMPUTABILITY ANALYSIS TECHNIQUE

(71) Applicant: Oracle International Corporation, Redwood Shores, CA (US)

(72) Inventors: Kenny C. Gross, Escondido, CA (US); Kalyanaraman Vaidyanathan, San Diego, CA (US); Anton A. Bougaev, La Jolla, CA (US); Aleksey M. Urmanov, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1000 days.

(21) Appl. No.: 15/173,220

(22) Filed: Jun. 3, 2016

(65) Prior Publication Data

US 2017/0351964 A1 Dec. 7, 2017

(51) Int. Cl.
*G06F 15/18* (2006.01)
*G06N 20/00* (2019.01)
*G06F 13/37* (2006.01)
*G06F 13/42* (2006.01)
*G06F 13/40* (2006.01)

(52) U.S. Cl.
CPC ............ *G06N 20/00* (2019.01); *G06F 13/37* (2013.01); *G06F 13/4022* (2013.01); *G06F 13/4282* (2013.01)

(58) Field of Classification Search
CPC .................................................. G06F 9/5072
USPC ...................................................... 706/15, 45
See application file for complete search history.

(56) References Cited

U.S. PATENT DOCUMENTS

| 7,020,802 B2 | 3/2006 | Gross et al. | |
| 2010/0125437 A1* | 5/2010 | Vasseur | H04L 43/10 702/188 |
| 2015/0208464 A1* | 7/2015 | Heo | H04W 84/18 702/189 |

* cited by examiner

*Primary Examiner* — David R Vincent
(74) *Attorney, Agent, or Firm* — Park, Vaughan, Fleming & Dowler LLP

(57) ABSTRACT

The disclosed embodiments relate to a system that reduces bandwidth requirements for transmitting telemetry data from sensors in a computer system. During operation, the system obtains a cross-imputability value for each sensor in a set of sensors that are monitoring the computer system, wherein a cross-imputability value for a sensor indicates how well a sensor value obtained from the sensor can be predicted based on sensor values obtained from other sensors in the set. Next, the system clusters sensors in the set of sensors into two or more groups based on the determined cross-imputability values. Then, while transmitting sensor values from the set of sensors, for a group of sensors having cross-imputability values exceeding a threshold, the system selectively transmits sensor values from some but not all of the sensors in the group to reduce a number of sensor values transmitted.

20 Claims, 7 Drawing Sheets

REDUCING BANDWIDTH REQUIREMENTS FOR TELEMETRY DATA USING A CROSS-IMPUTABILITY ANALYSIS TECHNIQUE

BACKGROUND

Field

The disclosed embodiments generally relate to techniques for communicating telemetry data obtained from sensors in computer systems. More specifically, the disclosed embodiments relate to the design of a system that uses a cross-imputability analysis technique to reduce bandwidth requirements for telemetry data in computer systems

Related Art

The limited I/O bandwidth provided by conventional system bus architectures is becoming a problem in enterprise computing systems. In particular, I/O bandwidth provided by system bus architectures has not kept pace with Moore's law inside enterprise servers and engineered systems. Meanwhile, the number of physical sensors (which measure various parameters, such as voltages, currents, fan speeds, power metrics, and vibration signals) has skyrocketed, as have internal "soft" telemetry metrics (throughputs, load metrics, queue lengths, MemStat memory metrics, quality-of-service metrics, etc). Consequently, the limited I/O bandwidth provided by system bus architectures (such as $I^2C$) is imposing constraints on sampling rates for all of the foregoing types of telemetry time series data. The resulting reduced telemetry sampling rates have a significant impact on new prognostic cybersecurity techniques, in that the advanced pattern-recognition techniques (machine learning, ML, and deep learning, DL) achieve much higher prognostic performance with the highest sampling rates achievable for all of the monitored time series.

Hence, what is needed is a method and an apparatus for improving effective sampling rates for telemetry data while operating within the constraints of the limited I/O bandwidth provided by conventional system bus architectures.

SUMMARY

The disclosed embodiments relate to a system that reduces bandwidth requirements for transmitting telemetry data from sensors in a computer system. During operation, the system obtains a cross-imputability value for each sensor in a set of sensors that are monitoring the computer system, wherein a cross-imputability value for a sensor indicates how well a sensor value obtained from the sensor can be predicted based on sensor values obtained from other sensors in the set. Next, the system clusters sensors in the set of sensors into two or more groups based on the determined cross-imputability values. Then, while transmitting sensor values from the set of sensors, for a group of sensors having cross-imputability values exceeding a threshold, the system selectively transmits sensor values from some but not all of the sensors in the group to reduce a number of sensor values transmitted.

In some embodiments, while selectively transmitting sensor values, the system performs a staggered round robin operation that periodically transmits sensor values from the set of sensors, and during successive transmissions of the sensor values, cycles through sensors in the group to select sensors to not transmit sensor values from.

In some embodiments, while obtaining the cross-imputability value for each sensor in the set of sensors, the system captures a set of sensor values obtained from the set of sensors, and divides the captured set of sensor values into a training data set and a testing data set. During a subsequent training phase, the system uses the training data set to train a nonparametric model that predicts a sensor value in the set of sensor values based on other sensor values in the set of sensor values. Next, during a testing phase, the system applies the nonparametric model to the testing data set to predict each sensor value in the set of sensor values, and compares each predicted sensor value with an actual sensor value obtained from the testing data set to determine a cross-imputability value for a corresponding sensor in the set In some embodiments, the nonparametric model comprises a Multivariate State Estimation Technique (MSET) model.

In some embodiments, while comparing each predicted sensor value with an actual sensor value, the system computes residuals over the set of testing data, wherein each residual comprises a difference between a predicted sensor value and an actual sensor value. Next, while determining the cross-imputability value for the corresponding sensor in the set of sensors, the system performs a root mean square (RMS) computation over the residuals associated with the corresponding sensor to obtain an RMS value. The system then applies an inverse function to the RMS value to obtain the cross-imputability value for the corresponding sensor, wherein the inverse function associates lower RMS values with higher cross-imputability values and higher RMS values with lower cross-imputability values.

In some embodiments, if a prognostic system that uses the sensor data is meeting false alarm probability (FAP) requirements and missed alarm probability (MAP) requirements, the system selectively transmits sensor values for an intermediate group of sensors having cross-imputability values, which are higher than for sensors in a lowest group of sensors and lower than for sensors in a highest group of sensors.

In some embodiments, the set of sensors includes: (1) physical sensors that monitor physical performance parameters, such as temperature, voltage, current, vibration, and acoustics; and (2) software monitoring mechanisms that monitor software-related telemetry parameters, such as processor load, memory and cache usage, system throughput, queue lengths, I/O traffic, and quality of service (QOS).

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
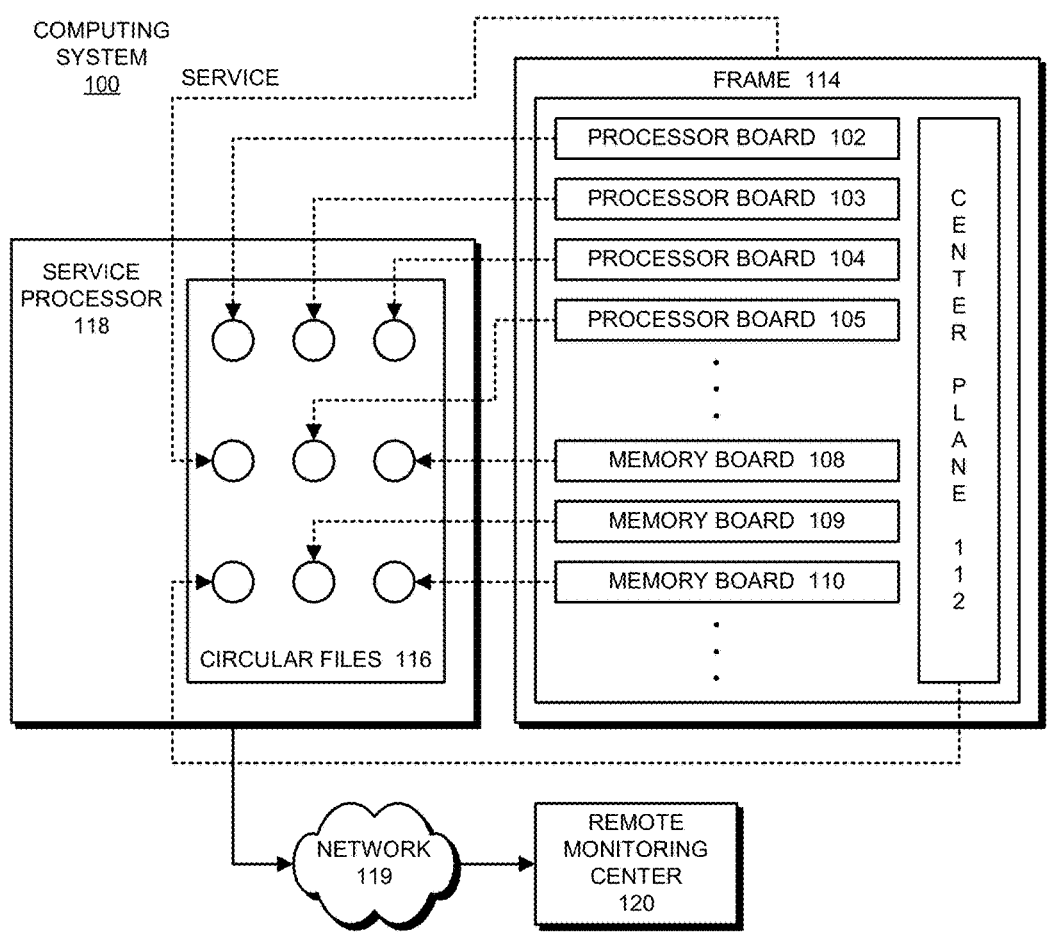
FIG. 1 illustrates a computer system that includes a service processor for processing telemetry signals in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide significantly higher bandwidth and throughput for prognostic and cybersecurity applications, which improves accuracy for the digitized time series telemetry signals being monitored. This breakthrough is achieved with no hardware modifications in any of the IT systems, storage, engineered systems, or networks and, hence, is backward-compatible with the hundreds of thousands of legacy systems in the field.

Modern computer systems designed for high reliability, availability and serviceability (RAS) application environments presently contain hundreds to thousands of physical sensors to monitor the condition of individual components such as power supplies, AC/DC converters, memory and CPU modules, ASICs, hard disk drives and other components. For example, a single socket two rack-unit server may have up to 150 physical sensors. Some presently shipping 4U servers have over 600 sensors, and a rack-size system may have a few thousand sensors.

As computers get hotter and denser with Moore's law, thermal and electrical margin assurance for systems presents ever-increasing challenges. This has motivated an increase in the density of sensors in systems. The increased number of sensors has created a problem because I/O bandwidth for system bus architectures has not kept pace with Moore's law. In the future, the industry may move to a new system bus standard, but no single vendor wants to "go it alone" and implement a non-standard system bus. Hence, for the foreseeable future, the computing industry will be using existing system bus architectures, which provide only limited bandwidth for communicating sensor data.

The problem that has been created by limited bus bandwidth is that as the number of sensors in servers has grown, the sampling rate for those sensors has fallen. Thus, for some new systems the sensors can be sampled only once a minute or less frequently. This is a problem because depending on a particular degradation mechanism one wants to monitor for, a higher sampling rate may be required to detect the onset of signatures of impending failures. This is particularly true for prognostic cybersecurity techniques, wherein advanced pattern-recognition algorithms are used to proactively detect anomalies in the patterns among multitudes of dynamic telemetry time series. The prognostic pattern-recognition algorithms perform less well with sparse telemetry. Hence, getting more telemetry through tight bandwidth constraints will benefit prognostic cybersecurity in terms of higher sensitivity for detecting anomalous patterns, and with even lower false-alarm and missed-alarm probabilities (FAPs and MAPs).

The disclosed embodiments overcome the above-described bandwidth challenges by providing a novel technique for systematically varying the sampling rate for individual sensors so that all diagnostic and prognostic functionality can be met within the I/O bandwidth constraints of typical system bus architectures and even for very large numbers of sensors.

The new innovation disclosed herein consumes as input raw telemetry signals, but then processes and acts upon that information with a novel and unobvious "Round-Robin Staggered-Imputation" (RRSI) innovation to, in effect, achieve higher sampling rates, with more accurate signals, than was heretofore possible in enterprise computing servers. The end result for system users is higher sensitivity for prognostic cybersecurity applications, and the provision of prognostic health monitoring applications that enhance the reliability, availability, and serviceability of servers, engineered systems, and networks.

This radically new approach can be described by way of a very trivial three-sensor analogy. Suppose we have a piston that is compressing air in a simple cylinder. Suppose we have three sensors, a Pressure sensor (P), a Temperature sensor (T), and a gauge that measures the Volume of the cylinder (V). It is desired to measure the three sensors P, V, and T with a high sampling rate but through a bus with limited I/O bandwidth.

One way we could analytically increase the effective sampling rate for these three sensors but without increasing the I/O bandwidth would be if we just sampled two signals at a time and then computed the 3rd signal. In this trivial example, we happen to know from the Ideal Gas Law a relationship between the three signals $P*V=n*R*T$. Knowing this relationship, we can: (1) for the 1st polling interval, sample P and V, use those to compute T; (2) for the 2nd polling interval, sample P and T, use those to compute V; and (3) for the 3rd polling interval, sample V and T, use those to compute P.

In effect, even though we have a limited bandwidth, we can now sample 33% faster and use the above staggered sampling algorithm to compute the unsampled signal at each time interval. The result is that we have complete time series for P, V, and T with a 33% greater sampling rate while meeting the same constrained I/O bandwidth.

For the multitudes of telemetry metrics inside complex computer servers, we rarely if ever have nice physics equations relating any of the telemetry signals to any other signals as in the trivial example above. However, we do have highly accurate empirical cross-correlation relationships as learned through advanced pattern recognition. Specifically, for one embodiment of this invention, we use an advanced pattern-recognition approach called the Multivariate State Estimation Technique (MSET). (Note that in using the term "MSET" in this specification and the appended claims, we are referring to generic nonlinear, nonparametric regression, not to a specific implementation or commercial product.)

The approach developed herein is analogous to the trivial three-variable illustration above, where we use MSET to "impute" one or more staggered values in a systematic round-robin approach. It is important to point out here that we are not using conventional "missing value interpolation" algorithms that "fill in" missing values in a univariate time series with any one of multiple conventional interpolation schemes. Conventional forms of univariate interpolation techniques suffer from the fact that they are inherently a "lossy" computation (in other words, no matter how cleverly one interpolates to replace a missing value in a univariate time series, the "true" value could be significantly different). Note that our novel RSSI technique developed herein is not "lossy" at all. In fact our breakthrough innovation for enhanced prognostics and enhanced cybersecurity is "gainy" insofar as the "imputed" values are actually more accurate than if the values had been sampled by a hardware or software sensor.

The approach taught below is fundamentally analogous to the trivial three-variable model described above. In particular, we stagger the sampling rate in a systematic fashion and use a functional relationship, such as NLNP regression, to compute the unsampled values for signals from the sampled values for other signals, such that all sensors can be sampled under given constraints on the service bus bandwidth and computational resources of the service processor, while at the same time reliably detecting all desired anomaly mechanisms.

In essence, the disclosed embodiments provide a novel and non-obvious technique to communicate a lot more telemetry data through a fixed system bus bandwidth than can be achieved through conventional means. Some people may ask whether we have considered compressing the telemetry at its origin, then uncompressing it when the data is consumed outside the server by monitoring agentry. In fact, all telemetry data is maximally compressed to binary streams these days. Even though all telemetry data is already compressed, and in spite of the severe bandwidth constraints for enterprise servers, which cannot be changed any time in the foreseeable future, our innovation gets more telemetry data through finite-bandwidth "pipes" (more signals at the same sampling rates, or the same number of signals at higher sampling rates), regardless of whether the data is compressed to binary or uncompressed as raw ASCII streams.

To summarize, the disclosed embodiments provide a method and apparatus for assigning sampling policies to individual sensors and clusters of sensors in a computer system based on the cross-imputability property that allows sampling of all sensors under given bandwidth constraints, while at the same time assuring reliable detection of degradation mechanisms, impending failures, and anomalous patterns that can be "indicators of compromise" (IOCs) for prognostic cybersecurity applications. This cross-imputability property is computed for each sensor. The cross-imputability of a sensor indicates how well the values of this sensor can be predicted from the values of the other sensors in the system. All sensors are then grouped or clustered according to their cross-imputability property. (Note: the term "cluster" in this document is used in the statistical sense and does not imply that physical sensors are spatially clustered into close proximity to one another. Sensors that are well correlated with one another and are clustered according to their cross-imputability may or may not be in close physical proximity.) Each cluster is assigned an appropriate cluster sampling policy. The number of sensor clusters and types of cluster sampling policies can vary depending on specifics of each computer system.

Hence, the disclosed embodiments provide a systematic way of clustering sensors in sensor-rich computer systems to devise realizable sensor sampling policies such that all sensors are sampled under given constraints on service bus bandwidth and computation resources of the system processor while assuring the reliable detection of impending failures or anomalous pattern detection for prognostic cybersecurity applications.

Note that there is no loss of accuracy in using this process; in fact, there is a gain in accuracy from the new RRSI technique. This is the case because the imputed value is being computed with multiple other correlated signals that are measured at the same instant in time as the imputed value, so that if there is a disturbance in the system being monitored, it will very likely be reflected through the multiple correlated values being leveraged in our round-robin staggered-imputation algorithm. (Compare this with a conventional univariate missing-value imputation approach that is basically filling in a "blind spot" in a univariate time series with an interpolated value).

For effective utilization of sensors in sensor-rich computer systems, this technique allows system designers to intelligently devise sensor sampling policies using trained pattern-recognition models.

During the system design process, this technique empowers system engineers with a means of specifying more sensors when desirable under limited bandwidth and the constraints of computational resources, and dropping sensors that are not important for reliable detection of impending failures and for cybersecurity applications.

In one exemplary embodiment, three sensor clusters are created. A first sensor cluster contains all sensors with low cross-imputability. A second sensor cluster contains all sensors with moderate cross-imputability. A third sensor cluster contains all sensors with high imputability. Each of the three clusters is assigned a sampling policy. For example, in the first cluster that contains sensor values which are hard to predict using the other sensors, each sensor is sampled with a fixed high sampling rate. In the second cluster, all sensors are sampled with a moderate sampling rate. Finally, in the third cluster, sensors are sampled in a round-robin fashion with appropriate sampling rates. Note that sampling rates across the clusters can be adjusted to satisfy bandwidth and computational constraints and assure reliable detection of impending failures.

Training Phase

The disclosed embodiments provide a training phase that operates as follows. First, the system captures all sensor values with highest possible sampling rates, ignoring the bandwidth and computational limitations applicable to the operating environment. Note that during design of the system, some additional hardware/software can be employed to assure capturing all sensors at sampling rates adequate to assure reliable detection of impending failures.

Next, the system builds nonparametric models that predict the value of a sensor using the values of all the other sensors. A preferred nonparametric technique is the Multivariate State Estimation Technique (MSET). To build a reliable nonparametric model, the data set is split into a training subset and a validation subset. A model is built using the training subset, and is subsequently validated using the validation subset.

Figure 5:
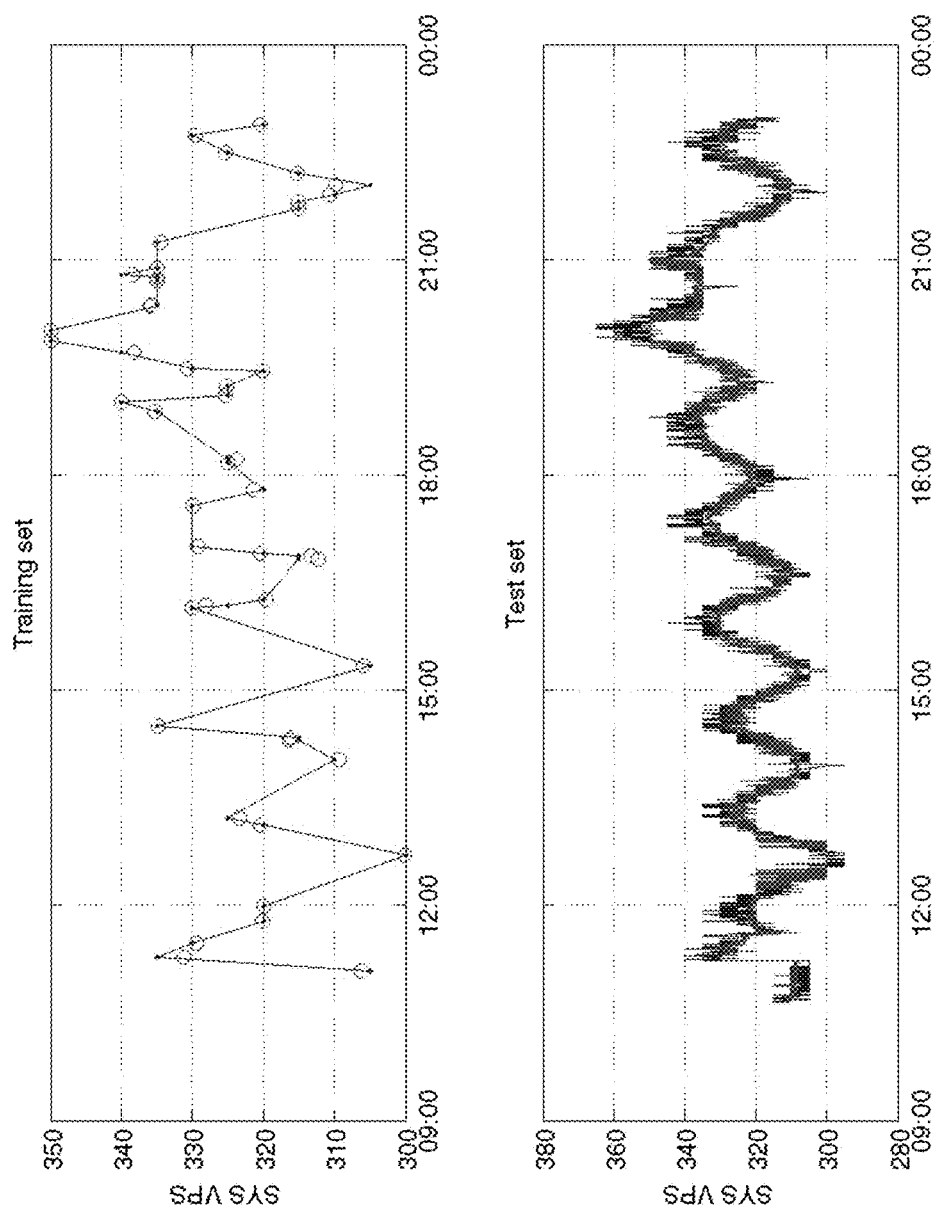
FIG. 5 illustrates the performance of an exemplary sensor with good cross-imputability in accordance with the disclosed embodiments.
Figure 6:
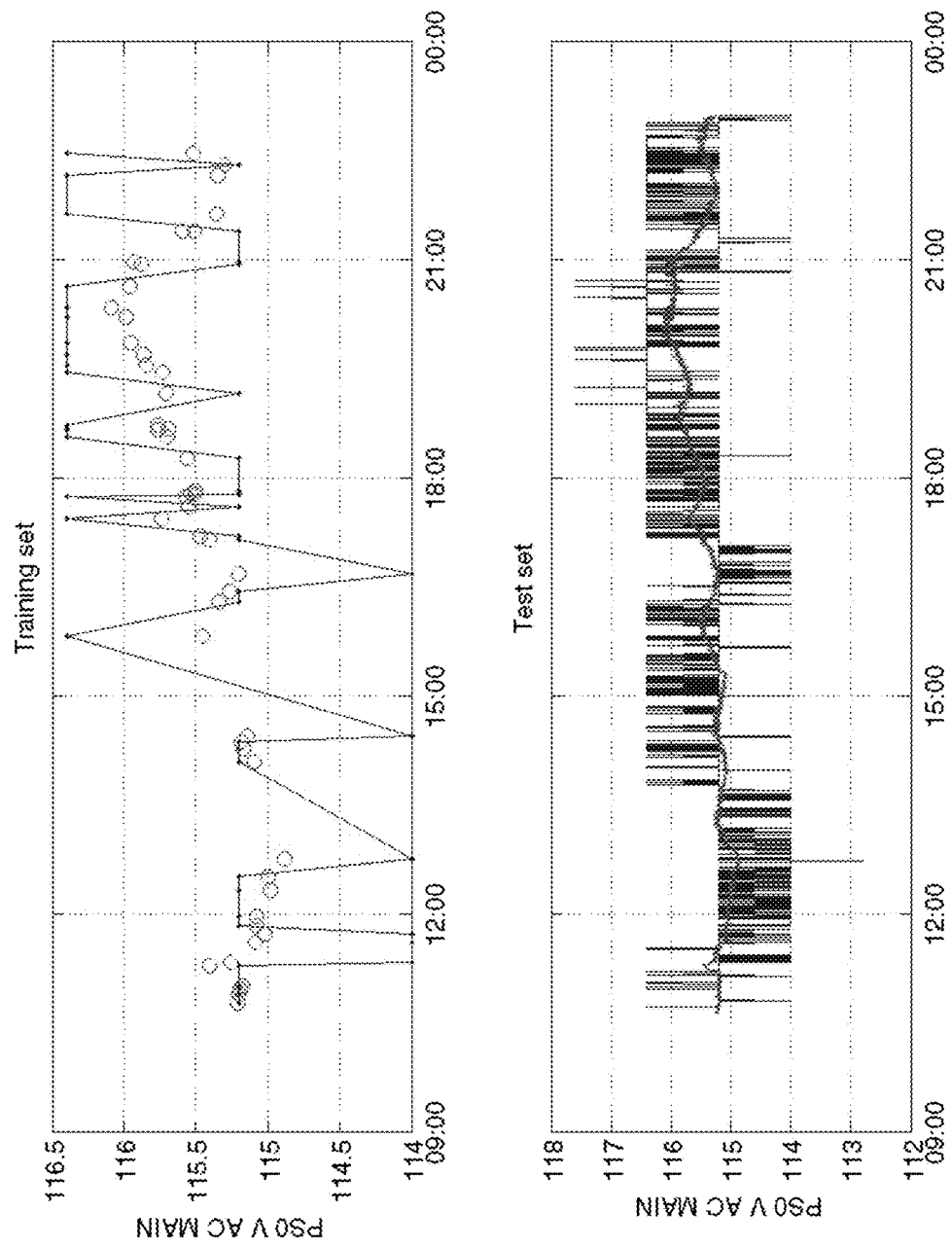
FIG. 6 illustrates the performance of an exemplary sensor with poor cross-imputability in accordance with the disclosed embodiments.
Figure 7:
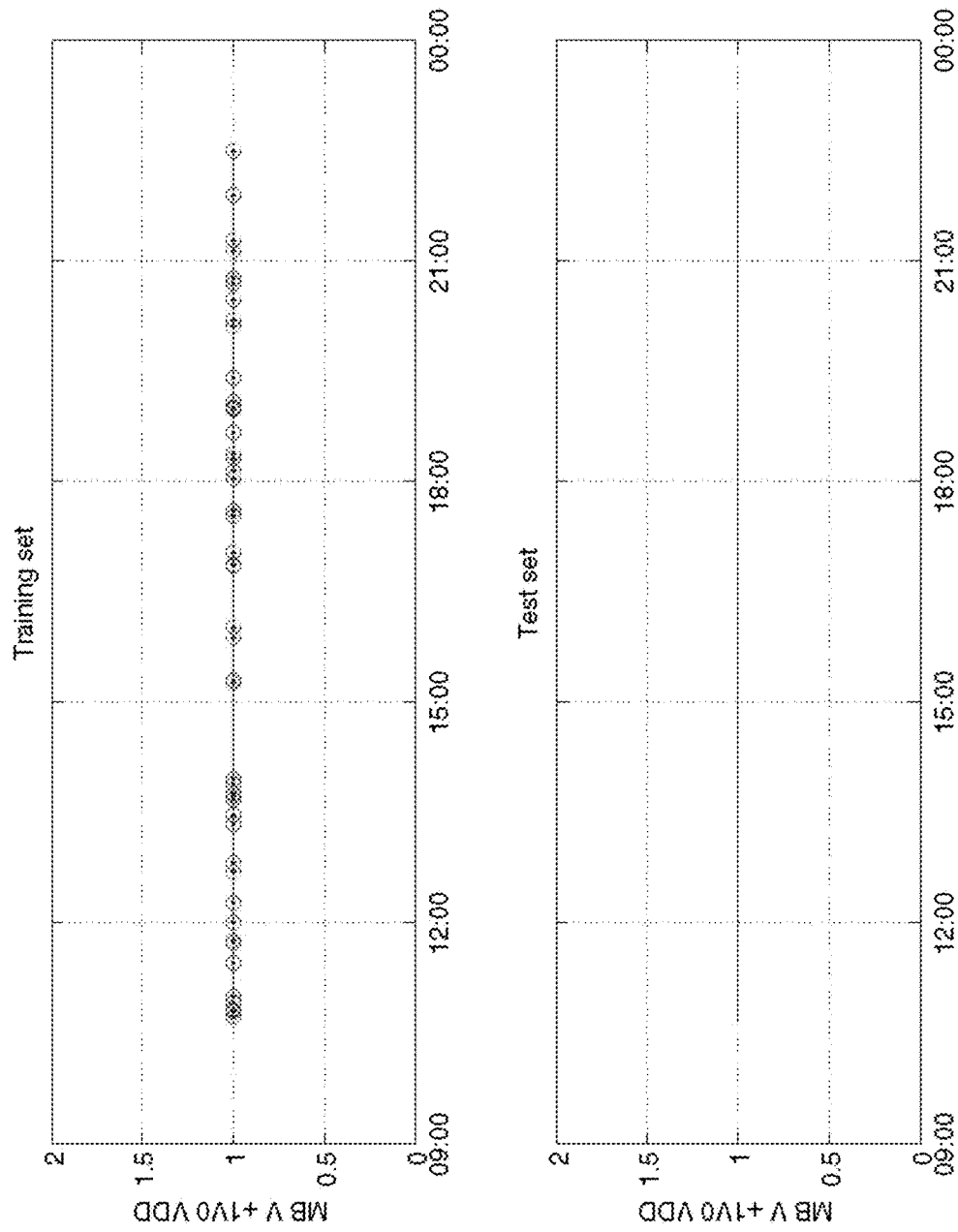
FIG. 7 illustrates the performance of an exemplary flat-line sensor in accordance with the disclosed embodiments.

For example, FIGS. 5-7 demonstrate the process of model building, wherein one model is built for each sensor. FIG. 5 illustrates an example of a sensor with good cross-imputability. Predictions of the values of VPS (virtual power sensor) use all variables (147) but the VPS as input variables and the VPS as the predicted variable. The top subplot shows the training data set consisting of 50 values picked at random during a 12-hour period. Blue dots connected by lines represent the actual VPS values; red circles represent the predictions by the model built on these 50 values. The bottom subplot represents the prediction (in red) of the VPS values (in blue) on the full data set. Note that the predicted values are consistent with the actual measured values which reflects good cross-imputability of the VPS sensor. In contrast to FIG. 5, FIG. 6 provides an example of a sensor with poor cross-imputability. This sensor monitors input alternating current (AC) voltage to one of the power supplies. Finally, FIG. 7 provides an example of a flat-line sensor. Note that in this case there exists no variation in the sensor's values with which to build a cross-imputability model.

After the model-building process is complete, the system computes a cross-imputability value for each sensor. In one embodiment the cross-imputability is assessed by using the prediction error over the entire data set. If the prediction error is small, the cross-imputability is high, wherein values of sensors with high cross-imputability are well predicted by nonparametric models. If the prediction error is large, the cross-imputability is low, wherein the values of sensors with low cross-imputability are hard for the models to predict.

Finally, all sensors are clustered according to their cross-imputability properties. Each cluster is comprised of sensors with a specified range of cross-imputability. For example, one cluster may comprise sensors with low cross-imputability. All sensors in this cluster must be sampled with sampling rates appropriate to catch impending failures. Another cluster may comprise sensors with high cross-imputability. Sensors in this cluster may be sampled using a round-robin approach that dramatically reduces the required bandwidth and computational resources.

Next, during a subsequent "monitoring phase," sensors are sampled according the corresponding cluster sensor policies as is described in more detail below.

Computer System

We now describe an exemplary implementation of the disclosed embodiments. Note that the disclosed embodiments provide a method and system for analyzing telemetry data from a computer system. The telemetry data may be obtained from an operating system of the computer system, a set of sensors in the computer system, and/or one or more external sensors that reside outside the computer system. As shown in FIG. 1, a computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, and/or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Alternatively, a single comprehensive circular file may be created and used to aggregate performance data for all FRUs within computer system 100.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computer system 100, as described below with respect to FIG. 2. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
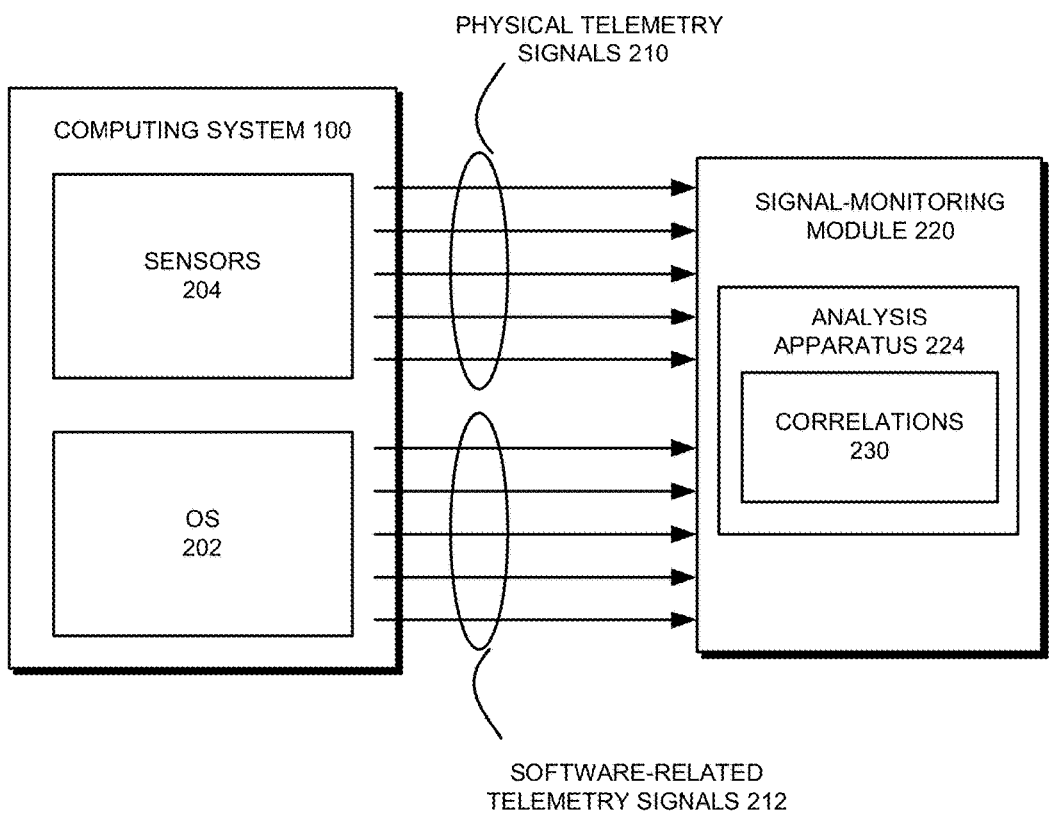
FIG. 2 illustrates a telemetry analysis system in accordance with the disclosed embodiments.

FIG. 2 shows a telemetry analysis system in accordance with an embodiment. In this example, a computer system 200 is monitored using a number of telemetric signals, including physical telemetry signals 210 and software-related telemetry signals 212, which are transmitted to a signal-monitoring module 220. Signal-monitoring module 220 may assess the state of computer system 200 using these telemetry signals 210 and 212. For example, signal-monitoring module 220 may analyze telemetry signals 210 and 212 to detect and manage faults in computer system 200 and/or issue alerts when there is an anomaly or degradation risk in computer system 200.

Signal-monitoring module 220 may be provided by and/or implemented using a service processor associated with computer system 200. Alternatively, signal-monitoring module 220 may reside within a remote monitoring center (e.g., remote monitoring center 120 of FIG. 1) that obtains telemetry signals 210 from computer system 200 over a network connection. Moreover, signal-monitoring module 220 may include functionality to analyze both real-time telemetry signals 210 and 212 and long-term historical telemetry data. For example, signal-monitoring module 220 may be used to detect anomalies in telemetry signals 210 and 212 received directly from the monitored computer system(s). Signal-monitoring module 220 may also be used in offline detection of anomalies from the monitored computer system(s) by processing archived and/or compressed telemetry data associated with the monitored computer system(s).

Prior to analyzing telemetry signals 210 and 212, analysis apparatus 224 may aggregate and pre-process telemetry signals 210 and 212. Moreover, during pre-processing of telemetry signals 210 and 212, analysis apparatus 224 may synchronize disparate sampling streams by standardizing timestamps of telemetry signals 210 and 212 from different domains. Next, analysis apparatus 224 may transform telemetry signals 210 and 212 into signals with uniform sampling rates. For example, analysis apparatus 224 may use an analytical re-sampling process (ARP) to up-sample signals with slower sampling rates to match the highest sampling rates in the aggregation of monitored telemetry signals 210 and 212.

In one or more embodiments, the nonlinear, nonparametric regression technique used by analysis apparatus 224 corresponds to a Multivariate State Estimation Technique (MSET). Analysis apparatus 224 may be trained using historical telemetry data from computer system 200 and/or similar computer systems. The historical telemetry data may be used to determine correlations 230 among various telemetry signals 210 and 212 collected from the monitored computer system(s).

Those skilled in the art will appreciate that the nonlinear, nonparametric regression technique used in analysis apparatus 224 may be provided by any number of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term "MSET" as used in this specification can refer to (among other things) any of the 25 techniques outlined in Gribok, including Ordinary Least Squares (OLS), Support Vector Machines (SVM), Artificial Neural Networks (ANNs), MSET, or Regularized MSET (RMSET).

Process of Transmitting Sensor Values in the Computing System

During operation of computing system 100, both physical telemetry signals 210 and software-related telemetry signals 212 are transmitted within computer system 100, and also from computing system 100 to external destinations, such as remote monitoring center 120. As mentioned above, because of the large number of sensors in computing system 100, a large amount of bandwidth is required to transmit all of this sensor data, which can be a problem if the sensor data is transmitted through standardized system bus architectures, such as $I^2C$. To remedy this problem, the disclosed embodiments make use of cross-imputability values to reduce the bandwidth required to transmit these sensor values. (Note that the term "sensors" as used in this specification and the appended claims refers to both "physical sensors" that generate physical telemetry parameters 210, and "software mechanisms" that generate software-related telemetry parameters 212. Moreover, the term "sensor values" as used in this specification and the appended claims refers to both values for physical telemetry parameters 210 and values for software-related telemetry parameters 212.)

Figure 3:
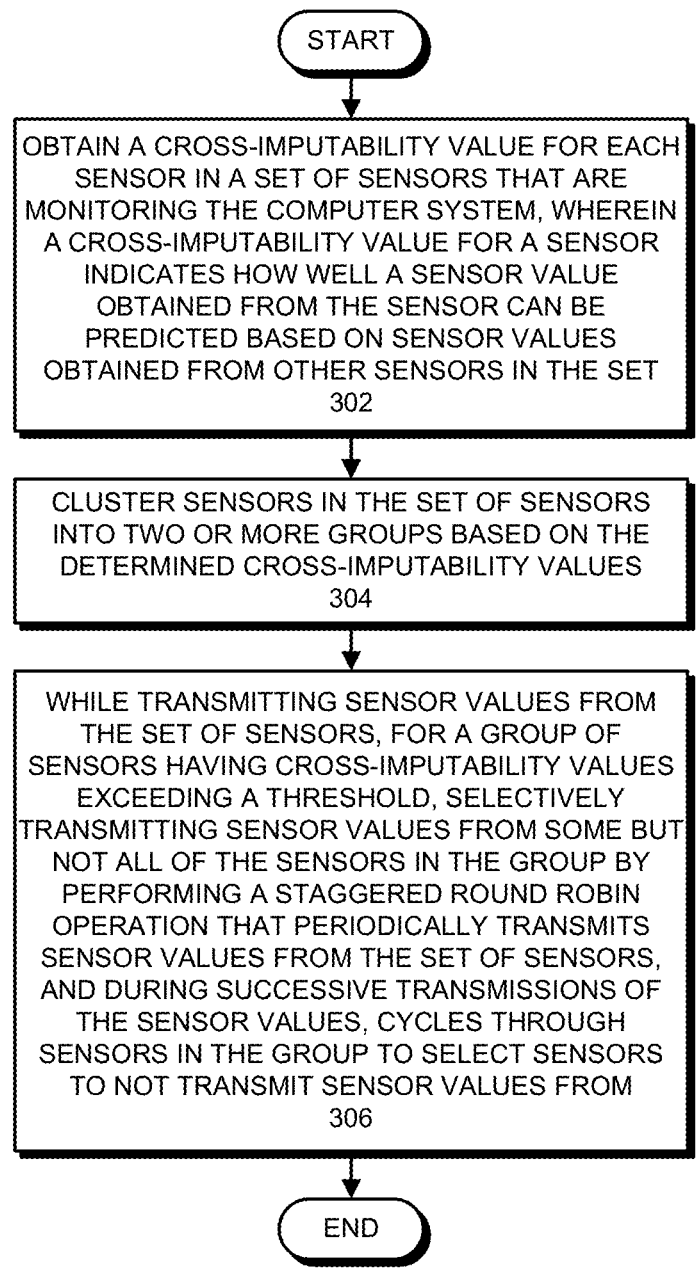
FIG. 3 presents a flowchart illustrating the process of transmitting sensor values in accordance with the disclosed embodiments.

FIG. 3 presents a flowchart illustrating the process of transmitting sensor values in accordance with the disclosed embodiments. During operation, the system obtains a cross-imputability value for each sensor in a set of sensors that are monitoring the computer system, wherein a cross-imputability value for a sensor indicates how well a sensor value obtained from the sensor can be predicted based on sensor values obtained from other sensors in the set (step 302). Next, the system clusters sensors in the set of sensors into two or more groups based on the determined cross-imputability values (step 304). Then, while transmitting sensor values from the set of sensors, for a group of sensors having cross-imputability values exceeding a threshold, the system selectively transmits sensor values from some but not all of the sensors in the group by performing a staggered round robin operation that periodically transmits sensor values from the set of sensors, and during successive transmissions of the sensor values, cycles through sensors in the group to select sensors to not transmit sensor values from (step 306).

Figure 4:
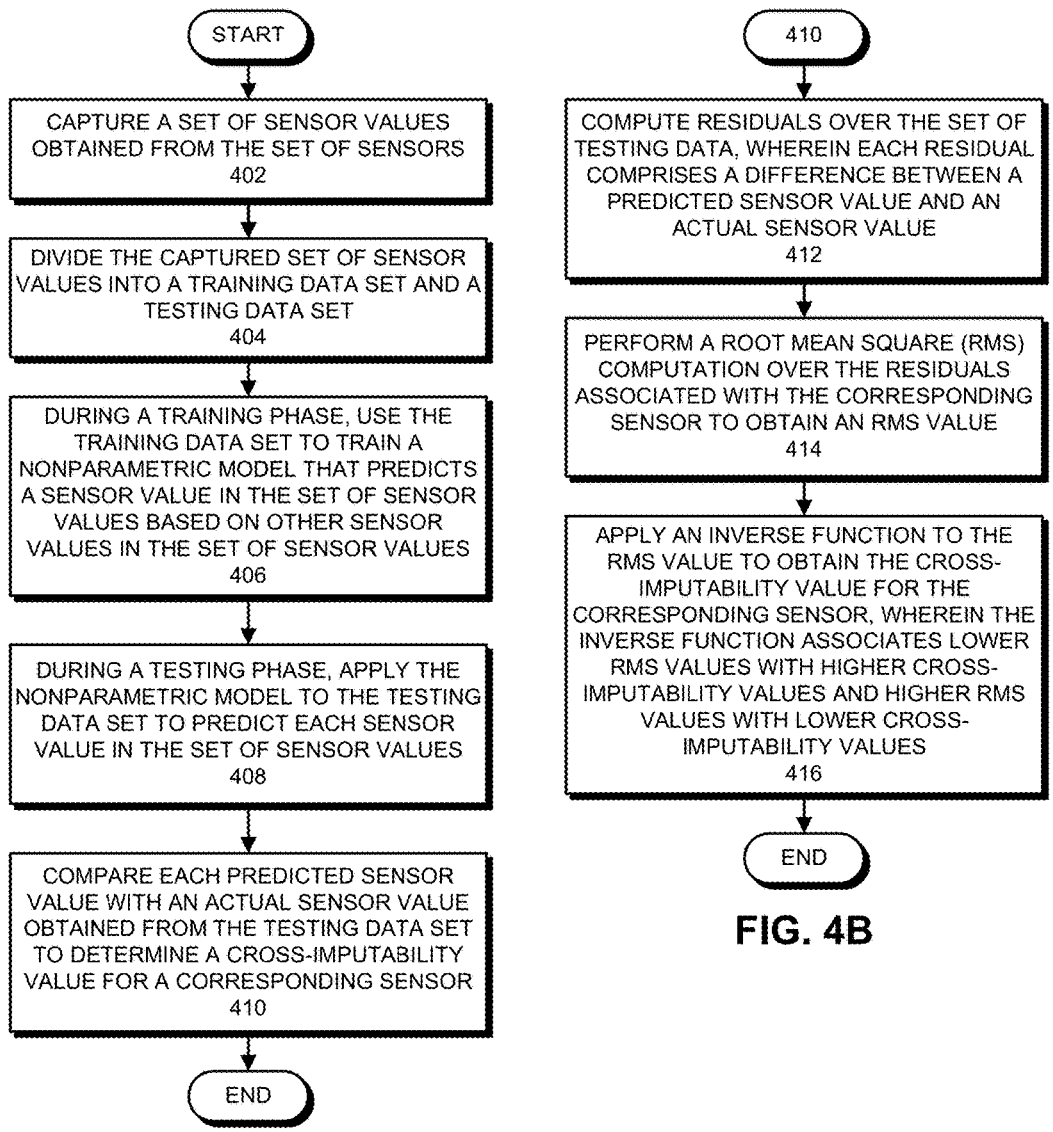
FIGS. 4A and 4B present flowcharts that collectively illustrate the process of determining a cross-imputability value for a sensor in accordance with the disclosed embodiments.

FIG. 4A presents a flowchart illustrating the process of determining a cross-imputability value for a sensor in accordance with the disclosed embodiments. The system first captures a set of sensor values obtained from the set of sensors (step 402), and then divides the captured set of sensor values into a training data set and a testing data set (step 404). Next, during a training phase, the system uses the training data set to train a nonparametric model that predicts a sensor value in the set of sensor values based on other sensor values in the set of sensor values (step 406). Then, during a testing phase, the system applies the nonparametric model to the testing data set to predict each sensor value in the set of sensor values (step 408). The system then compares each predicted sensor value with an actual sensor value obtained from the testing data set to determine a cross-imputability value for a corresponding sensor (step 410).

Referring to the flowchart illustrated in FIG. 4B, while comparing each predicted sensor value with an actual sensor value, the system computes residuals over the set of testing data, wherein each residual comprises a difference between a predicted sensor value and an actual sensor value (step 412). Next, while determining the cross-imputability value for the corresponding sensor in the set of sensors, the system performs a root mean square (RMS) computation over the residuals associated with the corresponding sensor to obtain an RMS value (step 414). The system then applies an inverse function to the RMS value to obtain the cross-imputability value for the corresponding sensor, wherein the inverse function associates lower RMS values with higher cross-imputability values and higher RMS values with lower cross-imputability values (step 416).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for reducing bandwidth requirements for transmitting telemetry data from sensors in a computer system, comprising:
   obtaining a cross-imputability value for each sensor in a set of sensors that are monitoring the computer system, wherein a cross-imputability value for a sensor indicates how well a sensor value obtained from the sensor can be predicted based on sensor values obtained from other sensors in the set;
   clustering sensors in the set of sensors into two or more groups based on the determined cross-imputability values; and
   while transmitting sensor values from the set of sensors, for a group of sensors having cross-imputability values exceeding a threshold, selectively transmitting sensor values from some but not all of the sensors in the group to reduce a number of sensor values transmitted.

2. The method of claim 1, wherein selectively transmitting sensor values from some but not all of the sensors in the group includes performing a staggered round robin operation that periodically transmits sensor values from the set of sensors, and during successive transmissions of the sensor values, cycles through sensors in the group to select sensors to not transmit sensor values from.

3. The method of claim 1, wherein obtaining the cross-imputability value for each sensor in the set of sensors includes:
   capturing a set of sensor values obtained from the set of sensors;
   dividing the captured set of sensor values into a training data set and a testing data set;
   during a training phase,
      using the training data set to train a nonparametric model that predicts a sensor value in the set of sensor values based on other sensor values in the set of sensor values;
   during a testing phase,
      applying the nonparametric model to the testing data set to predict each sensor value in the set of sensor values, and
      comparing each predicted sensor value with an actual sensor value obtained from the testing data set to determine a cross-imputability value for a corresponding sensor in the set of sensors.

4. The method of claim 3, wherein the nonparametric model comprises a Multivariate State Estimation Technique (MSET) model.

5. The method of claim 3,
   wherein comparing each predicted sensor value with an actual sensor value includes computing residuals over the set of testing data, wherein each residual comprises a difference between a predicted sensor value and an actual sensor value; and
   wherein determining the cross-imputability value for the corresponding sensor in the set of sensors comprises,
      performing a root mean square (RMS) computation over the residuals associated with the corresponding sensor to obtain an RMS value, and
      applying an inverse function to the RMS value to obtain the cross-imputability value for the corresponding sensor, wherein the inverse function associates lower RMS values with higher cross-imputability values and higher RMS values with lower cross-imputability values.

6. The method of claim 1, wherein if a prognostic system that uses the sensor data is meeting false alarm probability (FAP) requirements and missed alarm probability (MAP) requirements, the method further comprises selectively transmitting sensor values for an intermediate group of sensors having cross-imputability values, which are higher than for sensors in a lowest group of sensors and lower than for sensors in a highest group of sensors.

7. The method of claim 1, wherein the set of sensors includes:
   physical sensors that monitor physical performance parameters, such as temperature, voltage, current, vibration, and acoustics; and
   software monitoring mechanisms that monitor software-related telemetry parameters, such as processor load, memory and cache usage, system throughput, queue lengths, I/O traffic, and quality of service (QOS).

8. A non-transitory computer-readable storage medium storing instructions that when executed by a computer cause the computer to perform a method for reducing bandwidth requirements for transmitting telemetry data from sensors in a computer system, the method comprising:
   obtaining a cross-imputability value for each sensor in a set of sensors that are monitoring the computer system, wherein a cross-imputability value for a sensor indicates how well a sensor value obtained from the sensor can be predicted based on sensor values obtained from other sensors in the set;
   clustering sensors in the set of sensors into two or more groups based on the determined cross-imputability values; and
   while transmitting sensor values from the set of sensors, for a group of sensors having cross-imputability values exceeding a threshold, selectively transmitting sensor values from some but not all of the sensors in the group to reduce a number of sensor values transmitted.

9. The non-transitory computer-readable storage medium of claim 8, wherein selectively transmitting sensor values from some but not all of the sensors in the group includes performing a staggered round robin operation that periodically transmits sensor values from the set of sensors, and during successive transmissions of the sensor values, cycles through sensors in the group to select sensors to not transmit sensor values from.

10. The non-transitory computer-readable storage medium of claim 8, wherein obtaining the cross-imputability value for each sensor in the set of sensors includes:
   capturing a set of sensor values obtained from the set of sensors;
   dividing the captured set of sensor values into a training data set and a testing data set;
   during a training phase,
      using the training data set to train a nonparametric model that predicts a sensor value in the set of sensor values based on other sensor values in the set of sensor values;
   during a testing phase,
      applying the nonparametric model to the testing data set to predict each sensor value in the set of sensor values, and
      comparing each predicted sensor value with an actual sensor value obtained from the testing data set to determine a cross-imputability value for a corresponding sensor in the set of sensors.

11. The non-transitory computer-readable storage medium of claim 10, wherein the nonparametric model comprises a Multivariate State Estimation Technique (MSET) model.

12. The non-transitory computer-readable storage medium of claim 10,
wherein comparing each predicted sensor value with an actual sensor value includes computing residuals over the set of testing data, wherein each residual comprises a difference between a predicted sensor value and an actual sensor value; and
wherein determining the cross-imputability value for the corresponding sensor in the set of sensors comprises,
performing a root mean square (RMS) computation over the residuals associated with the corresponding sensor to obtain an RMS value, and
applying an inverse function to the RMS value to obtain the cross-imputability value for the corresponding sensor, wherein the inverse function associates lower RMS values with higher cross-imputability values and higher RMS values with lower cross-imputability values.

13. The non-transitory computer-readable storage medium of claim 8, wherein if a prognostic system that uses the sensor data is meeting false alarm probability (FAP) requirements and missed alarm probability (MAP) requirements, the method further comprises selectively transmitting sensor values for an intermediate group of sensors having cross-imputability values, which are higher than for sensors in a lowest group of sensors and lower than for sensors in a highest group of sensors.

14. The non-transitory computer-readable storage medium of claim 8, wherein the set of sensors includes:
physical sensors that monitor physical performance parameters, such as temperature, voltage, current, vibration, and acoustics; and
software monitoring mechanisms that monitor software-related telemetry parameters, such as processor load, memory and cache usage, system throughput, queue lengths, I/O traffic, and quality of service (QOS).

15. A system that reduces bandwidth requirements for transmitting telemetry data from sensors in a computer system, comprising:
a memory;
a processor; and
a non-transitory computer-readable storage medium storing instructions that when executed by the processor cause the system to instantiate;
a transmission mechanism that transmits sensor values, wherein during operation, the transmission mechanism:
obtains a cross-imputability value for each sensor in a set of sensors that are monitoring the computer system, wherein a cross-imputability value for a sensor indicates how well a sensor value obtained from the sensor can be predicted based on sensor values obtained from other sensors in the set;
clusters sensors in the set of sensors into two or more groups based on the determined cross-imputability values; and
while transmitting sensor values from the set of sensors, for a group of sensors having cross-imputability values exceeding a threshold, selectively transmits sensor values from some but not all of the sensors in the group to reduce a number of sensor values transmitted.

16. The system of claim 15, wherein while selectively transmitting sensor values from some but not all of the sensors in the group, the transmission mechanism performs a staggered round robin operation that periodically transmits sensor values from the set of sensors, and during successive transmissions of the sensor values, cycles through sensors in the group to select sensors to not transmit sensor values from.

17. The system of claim 15, wherein while obtaining the cross-imputability value for each sensor in the set of sensors, the transmission mechanism:
captures a set of sensor values obtained from the set of sensors;
divides the captured set of sensor values into a training data set and a testing data set;
during a training phase,
uses the training data set to train a nonparametric model that predicts a sensor value in the set of sensor values based on other sensor values in the set of sensor values;
during a testing phase,
applies the nonparametric model to the testing data set to predict each sensor value in the set of sensor values, and
compares each predicted sensor value with an actual sensor value obtained from the testing data set to determine a cross-imputability value for a corresponding sensor in the set of sensors.

18. The system of claim 15, wherein the nonparametric model comprises a Multivariate State Estimation Technique (MSET) model.

19. The system of claim 15,
wherein while comparing each predicted sensor value with an actual sensor value, the transmission mechanism computes residuals over the set of testing data, wherein each residual comprises a difference between a predicted sensor value and an actual sensor value; and
wherein while determining the cross-imputability value for the corresponding sensor in the set of sensors, the transmission mechanism,
performs a root mean square (RMS) computation over the residuals associated with the corresponding sensor to obtain an RMS value, and
applies an inverse function to the RMS value to obtain the cross-imputability value for the corresponding sensor, wherein the inverse function associates lower RMS values with higher cross-imputability values and higher RMS values with lower cross-imputability values.

20. The system of claim 15, wherein if a prognostic system that uses the sensor data is meeting false alarm probability (FAP) requirements and missed alarm probability (MAP) requirements, the transmission mechanism selectively transmits sensor values for an intermediate group of sensors having cross-imputability values, which are higher than for sensors in a lowest group of sensors and lower than for sensors in a highest group of sensors.

* * * * *